United States Patent
Hildebrand et al.

(10) Patent No.: US 11,116,678 B2
(45) Date of Patent: Sep. 14, 2021

(54) MOBILITY AID

(71) Applicant: OTTO BOCK MOBILITY SOLUTIONS GMBH, Konigsee-Rottenbach (DE)

(72) Inventors: Dmitrij Hildebrand, Bad Herrenalb (DE); Florian Doring, Erfurt (DE)

(73) Assignee: OTTO BOCK MOBILITY SOLUTIONS GMBH

( * ) Notice: Subject to any disclaimer, the term of this patent is extended or adjusted under 35 U.S.C. 154(b) by 120 days.

(21) Appl. No.: 16/304,042

(22) PCT Filed: May 22, 2017

(86) PCT No.: PCT/EP2017/062214
§ 371 (c)(1),
(2) Date: Feb. 5, 2019

(87) PCT Pub. No.: WO2017/202745
PCT Pub. Date: Nov. 30, 2017

(65) Prior Publication Data
US 2019/0247249 A1 Aug. 15, 2019

(30) Foreign Application Priority Data
May 26, 2016 (DE) .......................... 102016109755.1

(51) Int. Cl.
*A61G 5/08* (2006.01)
*A61G 5/10* (2006.01)
*B62B 7/06* (2006.01)

(52) U.S. Cl.
CPC .............. *A61G 5/0866* (2016.11); *A61G 5/08* (2013.01); *A61G 5/0883* (2016.11); *A61G 5/1067* (2013.01); *B62B 7/062* (2013.01)

(58) Field of Classification Search
CPC .................................................... A61G 5/0866
(Continued)

(56) References Cited

U.S. PATENT DOCUMENTS 4,934,722 A * 6/1990 Goetzelman ............. A61G 5/08
 280/250.1
5,026,198 A * 6/1991 Lin .......................... E06C 1/32
 16/324

(Continued)

FOREIGN PATENT DOCUMENTS

CA 940037 1/1974
CA 2418491 A1 3/2002
(Continued)

OTHER PUBLICATIONS

PCT International Search Report for PCT International Patent Application No. PCT/EP2017/062214, dated Jul. 24, 2017.

*Primary Examiner* — Jeffrey J Restifo
(74) *Attorney, Agent, or Firm* — Holland & Hart LLP

(57) ABSTRACT

A mobility aid, comprising a first frame member, a second frame member, and at least one pivoting member, which is connected to the first frame member and is pivotably mounted about a pivot axis to the second frame member. The pivoting member can be moved into a use position and into a transport position relative to the second frame member. A first locking device locks the pivoting member relative to the second frame member whenever the pivoting member is in the use position. A second locking device locks the first frame member relative to the second frame member whenever the pivoting member is in the transport position.

18 Claims, 4 Drawing Sheets

(58) Field of Classification Search
USPC .......................................... 280/642, 647, 650
See application file for complete search history.

(56) References Cited

U.S. PATENT DOCUMENTS

| | | | | |
|---|---|---|---|---|
| 5,058,239 | A * | 10/1991 | Lee ........................... | E06C 1/32 16/324 |
| 5,460,398 | A * | 10/1995 | Huang ....................... | B62B 7/06 280/642 |
| 5,681,045 | A * | 10/1997 | Liao .......................... | A63B 63/004 273/400 |
| 5,743,671 | A * | 4/1998 | Williams ................... | B62B 7/08 403/316 |
| 6,311,999 | B1 * | 11/2001 | Kueschall ................. | A61G 5/00 280/250.1 |
| 6,485,216 | B1 * | 11/2002 | Cheng ....................... | B62B 7/06 280/47.36 |
| 6,722,690 | B2 * | 4/2004 | Lan ........................... | B62B 7/08 280/47.38 |
| 7,614,640 | B2 * | 11/2009 | Dean ......................... | B62B 7/123 280/642 |
| 7,942,159 | B2 * | 5/2011 | Choi ......................... | E04H 15/48 135/120.3 |
| 8,092,111 | B2 * | 1/2012 | Wu ........................... | B62B 7/08 403/102 |
| 8,226,110 | B2 * | 7/2012 | Liao .......................... | B62B 7/062 280/47.38 |
| 8,276,935 | B2 * | 10/2012 | Minato ..................... | B62B 7/062 280/647 |
| 8,342,564 | B2 * | 1/2013 | Popp ........................ | F16B 7/1445 280/47.371 |
| 8,419,025 | B2 * | 4/2013 | Chen ........................ | B62B 7/10 280/47.36 |
| 8,430,420 | B2 * | 4/2013 | Chen ........................ | B62B 7/083 280/647 |
| 8,444,170 | B2 * | 5/2013 | Chen ........................ | B62B 7/08 280/642 |
| 8,474,836 | B2 * | 7/2013 | Yang ........................ | B62B 9/206 280/47.371 |
| 8,485,547 | B2 * | 7/2013 | Hsu .......................... | B62B 7/062 280/642 |
| 8,517,412 | B2 * | 8/2013 | Tsai .......................... | B62B 7/08 280/647 |
| 8,590,919 | B2 * | 11/2013 | Yi ............................. | B62B 7/08 280/642 |
| 8,635,743 | B2 * | 1/2014 | Smith ....................... | B62B 7/08 16/382 |
| 8,696,015 | B2 * | 4/2014 | Karremans ............. | B62B 7/064 280/642 |
| 8,807,587 | B2 * | 8/2014 | Funakura ................ | B62B 7/04 280/47.36 |
| 8,905,428 | B2 * | 12/2014 | Schroeder ................ | B62B 7/08 280/650 |
| 8,961,057 | B2 * | 2/2015 | Schroeder ................ | F16C 11/10 403/102 |
| 9,050,993 | B2 * | 6/2015 | Pollack .................... | B62B 9/12 |
| 9,540,028 | B2 * | 1/2017 | Taylor ..................... | B62B 7/062 |
| 10,150,496 | B2 * | 12/2018 | Oakes ...................... | B62B 9/12 |

FOREIGN PATENT DOCUMENTS

| | | |
|---|---|---|
| CH | 689177 A5 | 11/1998 |
| DE | 2118136 | 10/1971 |
| DE | 102008017132 B3 | 5/2009 |
| EP | 2106777 A2 | 10/2009 |
| EP | 2213270 A1 | 8/2010 |
| FR | 2948559 A1 | 2/2011 |
| GB | 2494450 A | 3/2013 |
| GB | 2513584 A | 5/2014 |
| JP | 2001321403 A | 11/2001 |
| TW | 308541 B | 6/1997 |
| WO | 2006045316 A1 | 5/2006 |
| WO | 2014020378 A1 | 2/2014 |

* cited by examiner

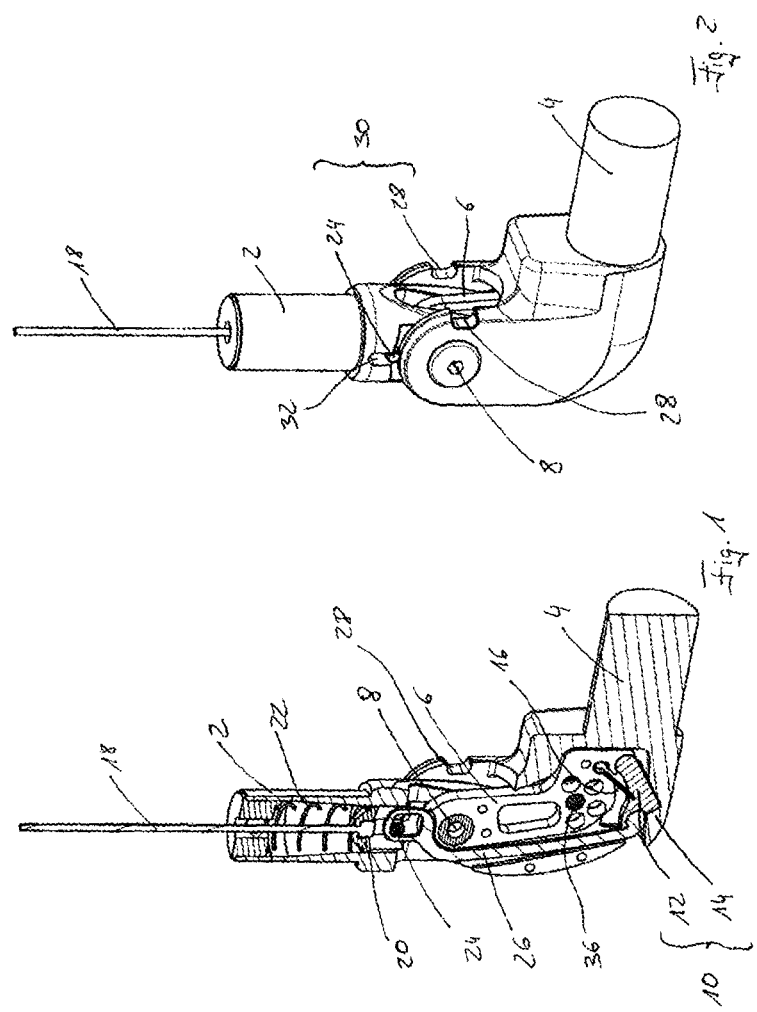

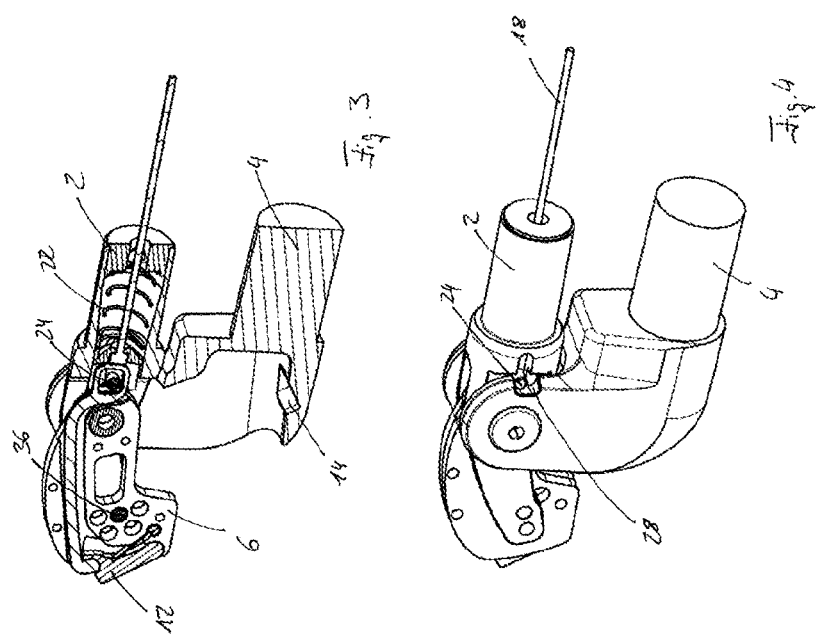

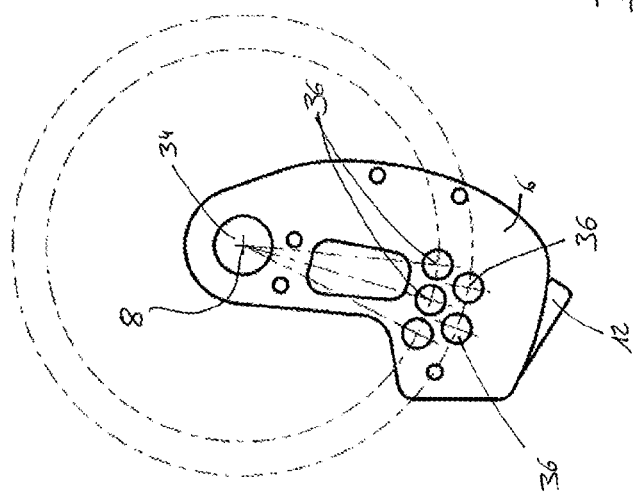

MOBILITY AID

TECHNICAL FIELD

The invention relates to a mobility aid comprising a first frame member, a second frame member, and at least one pivot member that is connected to the first frame member and is mounted on the second frame member so as to be pivotable about a pivot axis, it being possible for the pivot member to be brought into a use position and a transport position, relative to the second frame member.

BACKGROUND

Mobility aids have long been known in the prior art and are used for assisting people having restricted mobility. A mobility aid is understood in particular as wheelchairs, rollators, buggies and other devices.

It is known in particular for the purpose of transport, for example in the trunk of a motor vehicle, to collapse or fold the mobility aid in order to achieve a smaller packed size, such that the mobility aid can be easily transported. In order to achieve this, a plurality of different solutions are know from the prior art, in which for example a backrest of a wheelchair can be pivoted relative to the sitting surface of the wheelchair. Mobility aids of the type in question, in the form of a wheelchair, are known for example from EP 2 213 270 A1, CA 2 418 491 and WO 2014/020378 A1. In this case, the first frame member is part of the backrest of the corresponding wheelchair, while the second frame member is part of the sitting surface.

CH 689 177 A5 discloses a wheelchair in which the first frame member is connected to the second frame member by means of a hinge, and a connection and displacement component, in which a slot is provided, is in addition arranged between the two frame members. A protruding pin is arranged on the first component, which pin projects into the slot and can be pushed into said slot when the two frame members are pivoted about the hinge.

In order to achieve the greatest possible comfort for the user of the mobility aid, it is advantageous for an angle between a backrest of the mobility aid and a sitting surface of the mobility aid to be able to be set at a plurality of different angles, in order for it to be possible to take account of the individual requirements. This is achieved in CA 2 418 491 A1 and WO 2014/020378 A1 for example in that the first frame member can be arranged at the different positions on the pivot member, with the result that, in the unfolded state, i.e. when the pivot member is in the use position, different angles between the sitting surface and the backrest of the wheelchair can be achieved. If in this case, however, the pivot member is pushed into the use position, the packed size of the mobility aid changes depending on the position in which the first frame member is arranged on the pivot member, with the result that it is not always possible to achieve a minimal storage size.

This is also the case for the solution disclosed in EP 2 213 270 A. Solutions are therefore known from the prior art in which the first frame member can be arranged in just one position on the pivot member or in which the pivot member is formed integrally with the first frame member. In this case, the pivot member can be locked in various positions relative to the second frame member, which is generally part of the sitting surface, such that different settings of the backrest angle can be achieved. A disadvantage, however, is that a setting once made is lost as soon as the mobility aid is collapsed and the pivot member is pivoted relative to the second frame member, about the pivot axis, and into the transport position.

SUMMARY

The object of the invention is therefore that of developing a mobility aid of the type in question such that the smallest possible packed size is achieved, information regarding the set angle between the two frame members in the use position of the pivot member is not lost when the member is pivoted, and at the same time unintended opening or unfolding of the mobility aid is reliably prevented.

The object is achieved by the invention by means of a generic mobility aid according to the present invention which includes a first locking member that locks the pivot member relative to the second frame member when the pivot member is in the use position, and a second locking member that locks the first frame member relative to the second frame member when the pivot member is in the transport position.

A mobility aid according to the invention therefore comprises two locking means, of which one is effective in the use position and one is effective in the transport position, respectively, of the pivot member. This separation means that, unlike in the prior art, it is possible to lock, relative to one another, precisely the components of which the relative position is relevant in each case.

If the pivot member is in the use position, said use position is defined in that the first locking means is effective. The pivot member is locked relative to the second frame member. This means that further pivoting of the pivot member relative to the second frame member is not possible without the first locking means being released. The relative orientation or position in which the first frame member is located relative to the second frame member is therefore irrelevant for the use position. An angle set once between the backrest and the sitting surface of the mobility aid for example is therefore irrelevant for achieving the use position. Irrespective of the orientation or position in which the first frame part is fastened to the pivot member, the use position is always achieved when the first locking means is locked and effective.

In contrast thereto, the transport position is always achieved when the second locking means is locked and effective. In this case, however, it is not the orientation or positioning of the pivot member relative to the second frame member that is important, as is the case in the use position, but instead the positioning of the first frame member relative to the second frame member. Since these two frame members, for example the sitting surface and backrest, are intended to be made into the smallest possible packed size when collapsed, an angle between the two frame members in the use position is irrelevant for the transport position. The embodiment according to the invention of the mobility aid therefore results in the transport position being defined by the locking of the second locking means, which always occurs when the two frame members are located in the desired position relative to one another.

In a preferred embodiment, the first frame member can be releasably fastened to the pivot member at various positions. In this way, it is possible to set an angle between the two frame members in the use position of the pivot member. As already set out, the use position is defined by a specified relative position of the pivot member relative to the second frame part. The arrangement of the first frame part on the pivot member is entirely independent thereof and, in this preferred embodiment, can be set freely. The releasability of the connection also makes it possible to subsequently freely set an angle between the two frame members, for example the sitting surface and the backrest.

Advantageously, however, the position in which the first frame member is fastened to the pivot member does not have any influence on the position of the first frame member relative to the second frame member when the pivot member is in the transport position.

This means that, in the transport position, the first frame member always assumes the same position relative to the second frame member. This ensures that the same, preferably the smallest, installation space is always achieved, irrespective of the position of the first frame member relative to the pivot member.

The position in which the first frame member can be fastened to the pivot member can be set in a plurality of steps for example. This can be achieved for example by bores or holes provided on one of the two components, and corresponding pins or bolts on the other component.

Alternatively thereto, the position in which the first frame member can be fastened to the pivot member can advantageously be set in a stepless manner. This can be achieved for example by means of a slot on one of the components to be connected, and a pin on the other component in each case, which pin is movable in said slot for example when the first frame member is pivoted, relative to the pivot member, about a pivot axis. The two components can be fixed to one another in any desired position using a clamping means, for example a screw and a nut. In this case, too, the relative position of the first frame member relative to the pivot member is of no significance either for defining the use position or for defining the transport position. While the use position requires positioning of the pivot member relative to the second frame member, defining the transport position requires specified positioning of the first frame member relative to the second frame member.

In a preferred embodiment, the first locking means and the second locking means are released by an actuation means. Said actuation means may be a tension element, on which a tensile force is exerted in order to release the first locking means and/or the second locking means. In an embodiment of the mobility aid that is particularly easy to handle, the first locking means and the second locking means are released by the same actuation means. In this case, the user of the mobility aid does not need to distinguish which actuation element he has to actuate in order to unlock the locking means that is desired in each case, and transfer the pivot member out of the use position and into the transport position, or vice versa. Incorrect operation is therefore virtually excluded in this manner.

The tension element may be designed in the form of a wire of a Bowden cable, a band, or a rope. All that is important is that a material that can transmit tensile forces should be selected for the tension element. Of course, any other actuation means by means of which a locking means can be unlocked is also conceivable.

Advantageously, the first locking means comprises mutually corresponding locking elements which are arranged on the pivot member and on the second frame member. As soon as the pivot member is in the use position, said locking elements intermesh. Said elements may for example be latching or snap-in elements which engage in recesses or undercuts provided therefor.

Advantageously, the second locking means comprises mutually corresponding locking elements which are arranged on the first frame member and on the second frame member. This can also be achieved by means of latching or snap-in elements, or by means of a form-locking element, which elements engage in one another, and thus achieve locking, when the transport position of the pivot member is reached.

The locking elements of the first locking means and/or the locking elements of the second locking means are advantageously form-locking elements.

Advantageously, the position in which the first frame member is fastened to the pivot member does not change when the pivot member is moved out of the use position and into the transport position or vice versa. As a result, a position set once, in which position the first frame member is fastened to the pivot member, is maintained. The individual setting, in accordance with the wishes and requirements of the user of the mobility aid, is therefore retained.

The pivot member can preferably be moved into a plurality of different transport positions relative to the second frame member. The second locking means is preferably designed so as to lock the first frame member relative to the second frame member in a plurality of different transport positions. It is of course also possible, however, to provide a plurality of second locking means which each ensure locking of the first frame member relative to the second frame member in one or more of the mentioned transport positions in each case.

In a preferred embodiment, a backrest of the mobility aid is arranged on the first frame member, and a sitting surface of the mobility aid is arranged on the second frame member. Alternatively thereto, conversely the sitting surface is arranged on the first frame member and the backrest of the mobility aid is arranged on the second frame member.

BRIEF DESCRIPTION OF THE DRAWINGS

An embodiment of the present invention will be explained in greater detail in the following, on the basis of the accompanying drawings. In the drawings:

FIG. 1—is a schematic sectional view through a portion of a mobility aid according to a first embodiment of the present invention, in the use position, FIG. 2—is a schematic 3D view of the situation shown in FIG. 1, FIG. 3—is the view from FIG. 1 in the transport position, FIG. 4—is the view from FIG. 2 in the transport position, FIG. 5—is a schematic view of a pivot member, and FIGS. 6 and 7—show a portion of a first frame member and a pivot member that are arranged in different positions on one another.

DETAILED DESCRIPTION

Figure 7:
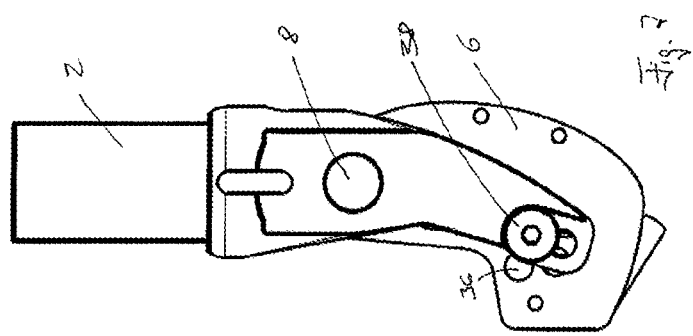

FIG. 1 is a schematic view of a detail of a mobility aid according to a first embodiment of the present invention. A portion of a first frame member 2 and of a second frame member 4 are visible. A pivot member 6 that is mounted on the second frame member 4 so as to be pivotable about a pivot axis 8 is located therebetween. FIG. 1 shows the situation in which the pivot member is in the use position. In this case, a first locking means 10 is therefore effective. In the embodiment shown, said locking means comprises a latching hook 12 that rests on a latching stop 14 provided therefor. The latching stop 14 is part of the second frame member 4, while the latching hook 12 is fastened to the pivot member 6. The latching hook 12 is preloaded into the position shown in FIG. 1 by means of a spring element 16 which is also arranged on the pivot member 6.

In the position shown, it is not possible to pivot the pivot member 6, on which the first frame member 2 is located, relative to the second frame member 4, because this is prevented by the latching hook 12 which rests on the latching stop 14.

The device shown in FIG. 1 comprises a tension element 18 in the form of a pulling cable, on the lower end of which a protrusion 20 is provided. In the region shown, the first frame member is formed as a hollow cylinder in which the protrusion 20 can move. In the embodiment shown, said protrusion is preloaded downwards by means of a helical spring 22. If, in the embodiment shown, an upwardly acting tensile force is then exerted on the tension element 18, the protrusion 20 is also displaced upwards, counter to the force exerted by the helical spring 22. A pin 24 which is connected to a traction lever 26 and the lower end of which is connected to the latching hook 12 in a form-locking manner is located on the protrusion 20. Consequently, in addition to the protrusion 20, the pin 24 fastened thereto and the traction lever 26 are also moved upwards by the tensile force exerted on the tension element 18, with the result that the latching hook 12 is displaced counter to the force of the spring element 16 and the first locking means 10 is released. Pivoting is not possible in this case. Instead of a traction lever 26, another element, for example a Bowden cable, may also be provided, by means of which element the force can be transmitted as by the traction lever 26.

A latching recess 28, which is part of a second locking means that locks the first frame member 2 relative to the second frame member 4 when the pivot member 6 is in the transport position, is additionally provided on the second frame member 4. In this case, the pin 24 engages in the latching recess 28.

FIG. 2 is a 3D view of the illustration from FIG. 1. The mode of operation of the first locking means 10 cannot be identified in FIG. 2. The pin 24 of the second locking means 30 is visible, however, which pin engages in the latching recess 28 provided therefor as soon as the pivot member 6 is in the transport position. It can be seen that a displacement recess 32 is provided in the first frame member 2, which recess allows for upwards displacement of the pin 24. This occurs when a tensile force is exerted on the tension element 18.

FIG. 3 is the view from FIG. 1 but in which the pivot member 6 is now in the transport position. The latching hook 12 is no longer engaged with the latching stop 14, and therefore the first locking means 10 is not effective.

FIG. 4 is a schematic 3D view of the situation shown in FIG. 3. It is clear in FIG. 4 that the pin 24 is located in the latching recess 28 provided therefor, and thus locks the first frame member 2 relative to the second frame member 4. Pivoting of the two frame members 2, 4 is not possible. It can furthermore be seen, in particular in FIG. 3, that a position of the pivot member 6 relative to the first frame member 2 is irrelevant for achieving said transport position. If a tensile force is now again exerted on the tension element 18, the helical spring 22 is compressed again and the pin 24 is moved to the right, as can be seen in FIG. 3. As a result, said pin comes out of engagement with the latching recess 28, and the second locking means is unlocked.

FIG. 5 is a schematic view of the pivot member 6. The latching hook 12, which is designed to engage with the latching hook 14, can be seen at the lower end. In order to fasten the first frame member 2 to the pivot member 6, various positions are possible in the embodiment shown in FIG. 5. The pivot member 6 comprises a main bore 34 through which for example a bolt or pin is guided in order to connect the first frame member 2 to the pivot member 6. In the particularly preferred embodiment shown in FIG. 5, the pivot axis 8 extends in the center of the main bore 34. This is particularly advantageous, but not essential.

The pivot member 6 furthermore comprises positioning bores 36 through which a pin-like or bolt-like element can likewise be guided in order to connect the first frame member 2 to the pivot member 6. Depending on which of the positioning bores 36 is used for this purpose, a slightly different angle results between the pivot member 6 and the first frame member 2. It can be seen for example in FIG. 1 that the denoted positioning bore 36 is used for fastening the first frame member 2 to the pivot member 6. This is also shown in FIG. 3.

It can be seen in particular in FIGS. 3 and 4 that the selection of the relevant positioning bore 36 that is used for positioning the first frame member 2 is entirely irrelevant for achieving the transport position of the pivot member 6, because all that is important is the positioning of the first frame member 2 relative to the second frame member 4. A setting selected once therefore does not need to be released in order to achieve optimal positioning of the two frame members 2, 4 relative to one another in the transport position of the pivot member 6.

Figure 6:
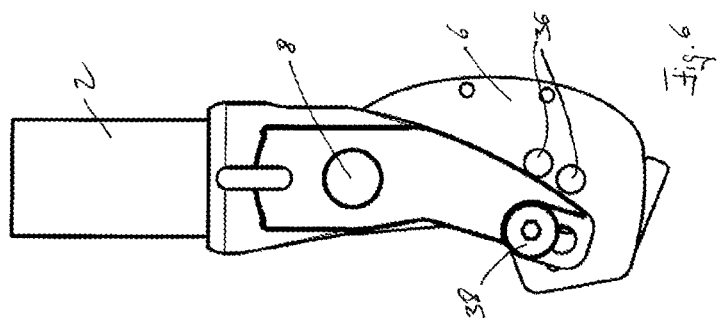

FIGS. 6 and 7 schematically show the pivot member 6, on which the first frame member 2 is located in each case. The first frame member 2 is fastened to the pivot member 6 by means of the screws 38 (shown schematically), in that the relevant screw 38 is guided through one of the positioning bores 36. Since different positioning bores 36 are used in FIGS. 6 and 7, the angle of the two components to be interconnected is slightly different.

The invention claimed is:

1. A mobility aid comprising:
   a first frame member;
   a second frame member;
   a pivot member that is connected to the first frame member and is mounted on the second frame member so as to be pivotable about a pivot axis, the pivot member being movable between a use position and a transport position relative to the second frame member;
   a first locking member that locks the pivot member relative to the second frame member when the pivot member is in the use position, wherein the first frame member is releasably fastened to the pivot member in various positions, the positions being independent of a position of the first frame member relative to the second frame member when the pivot member is in the transport position;
   a second locking member that locks the first frame member relative to the second frame member when the pivot member is in the transport position.

2. The mobility aid according to claim 1, wherein a position in which the first frame member can be fastened to the pivot member is set in a stepless manner.

3. The mobility aid according to claim 1, wherein the first locking member and the second locking member can be released by an actuation device, the actuation device comprising a tension element.

4. The mobility aid according to claim 1, wherein the first locking member comprises mutually corresponding locking elements that are arranged on the pivot member and on the second frame member.

5. The mobility aid according to claim 4, wherein at least one of the locking elements of the first locking member and the locking elements of the second locking member are form-locking elements.

6. The mobility aid according to claim 1, wherein the second locking member comprises mutually corresponding locking elements that are arranged on the first frame member and on the second frame member.

7. The mobility aid according to claim 1, wherein a position in which the first frame member is fastened to the pivot member does not change when the pivot member is moved out of the use position and into the transport position or vice versa.

8. The mobility aid according to claim 1, wherein the pivot member is movable into a plurality of different transport positions relative to the second frame member.

9. The mobility aid according to claim 1, wherein a backrest of the mobility aid is arranged on the first frame member and a sitting surface of the mobility aid is arranged on the second frame member, or vice versa.

10. A mobility aid comprising:
a first frame member;
a second frame member;
at least one pivot member that is connected to the first frame member and is pivotally mounted on the second frame member, the at least one pivot member being movable relative to the second frame member between a use position and a transport position;
a plurality of locking members that lock the at least one pivot member relative to the second frame member when the at least one pivot member is in the use and transport positions, wherein the first frame member is releasably fastened to the at least one pivot member in a plurality of positions, the positions being independent of a position of the first frame member relative to the second frame member when the at least one pivot member is in the transport position.

11. The mobility aid according to claim wherein the first frame member is adjustably fastened to the at least one pivot member in a stepless manner.

12. The mobility aid according to claim 10, wherein the first locking member and the second locking member are releasable by an actuation device, the actuation device comprising a tension element.

13. The mobility aid according to claim 10, wherein the first locking member comprises mutually corresponding locking elements that are arranged on the at least one pivot member and the second frame member.

14. The mobility aid according to claim 13, wherein at least one of the locking elements of the first locking member and the locking elements of the second locking member are form-locking elements.

15. The mobility aid according to claim 10, wherein the second locking member comprises mutually corresponding locking elements that are arranged on the first frame member and on the second frame member.

16. The mobility aid according to claim 10, wherein a position in which the first frame member is fastened to the at least one pivot member does not change when the at least one pivot member is moved out of the use position and into the transport position or vice versa.

17. The mobility aid according to claim 10, wherein the at least one pivot member is movable into a plurality of different transport positions relative to the second frame member.

18. The mobility aid according to claim 10, further comprising a backrest arranged on the first frame member and a sitting surface arranged on the second frame member, or vice versa.

* * * * *